Oct. 10, 1933.   A. KINDELMANN ET AL   1,930,055
TAPERED DOOR AND GATE
Filed Oct. 31, 1929   6 Sheets-Sheet 2

INVENTORS
Albert Kindelmann
Ewald Boecking
BY
Howard W. Dix
ATTORNEY

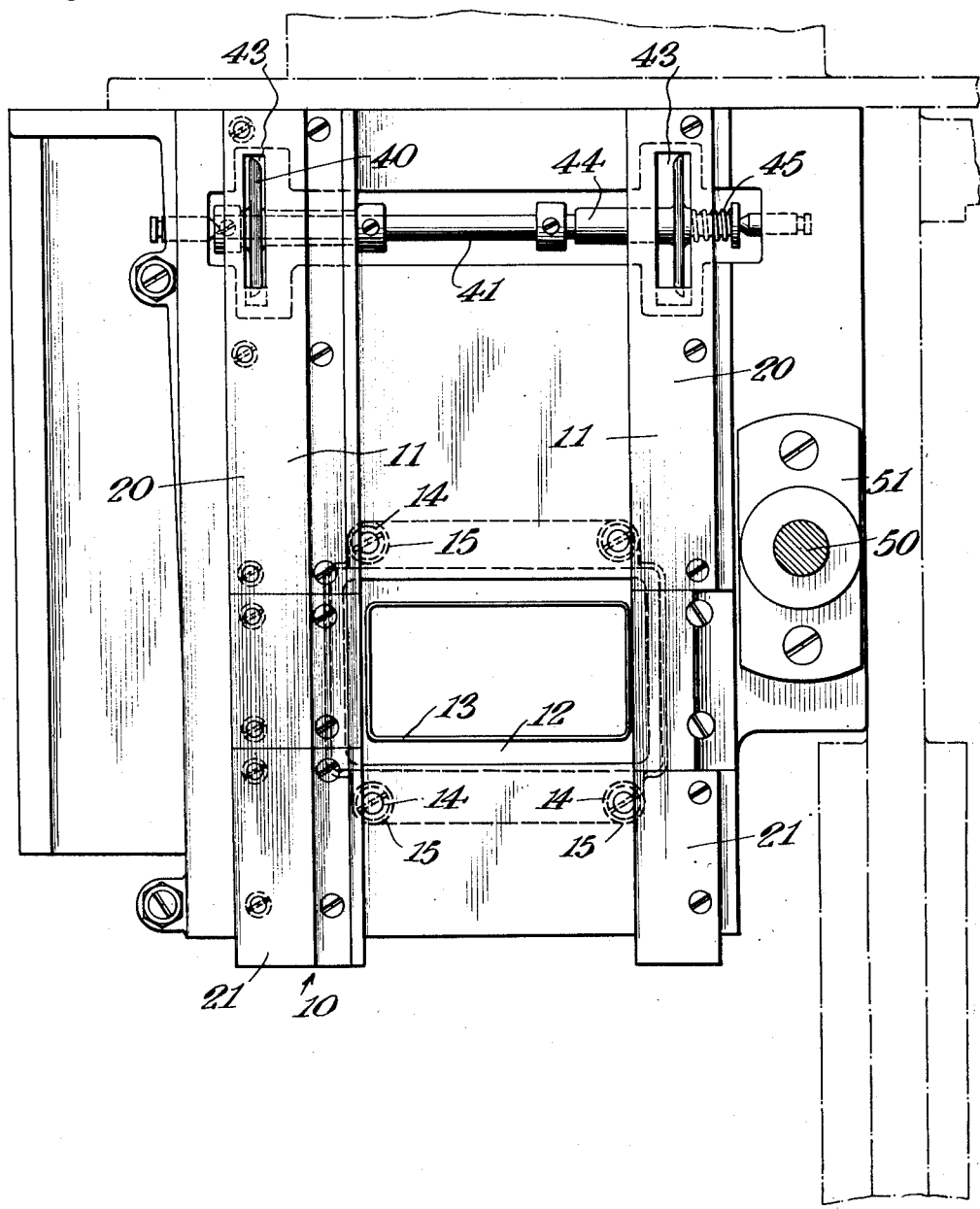

Oct. 10, 1933.　　A. KINDELMANN ET AL　　1,930,055
TAPERED DOOR AND GATE
Filed Oct. 31, 1929　　6 Sheets-Sheet 4

INVENTORS
Albert Kindelmann
Ewald Boecking
BY
Howard W. Dix
ATTORNEY

Oct. 10, 1933.　　A. KINDELMANN ET AL　　1,930,055
TAPERED DOOR AND GATE
Filed Oct. 31, 1929　　6 Sheets-Sheet 6

INVENTORS
Albert Kindelmann
Ewald Boecking
BY
Howard W. Dix
ATTORNEY

Patented Oct. 10, 1933

1,930,055

UNITED STATES PATENT OFFICE 1,930,055

TAPERED DOOR AND GATE

Albert Kindelmann, Floral Park, and Ewald Boecking, Brooklyn, N. Y., assignors to International Projector Corporation, New York, N. Y., a corporation of Delaware Application October 31, 1929. Serial No. 403,767

4 Claims. (Cl. 88—17)

This invention relates to motion picture machines, and more particularly to a new and improved aperture plate adapted to be used therein. The invention is particularly applicable to aperture plates for a projection machine using a comparatively wide film which presents a large unsupported surface in passing over the aperture.

An object of the present invention is to prevent buckling of a film as it passes over the aperture in a motion picture apparatus.

Another object is to positively align a film in a projection apparatus regardless of the film width.

A further object is to impart transverse strength to a film without increasing the longitudinal tension thereof.

The above objects and others which will be apparent as the nature of the invention is more fully disclosed, are accomplished by so forming the aperture plate that the direction of the film is changed at a point adjacent the aperture. The aperture plate may be formed with a plurality of plane surfaces or the entire plate may be curved in the manner to be pointed out. It has been found that when the direction of travel of the film is changed adjacent the aperture, as by a curved aperture plate, the transverse strength of the film is increased and the tendency of the unsupported film over the aperture to buckle is decreased. This is due to the fact that when a flexible object is rolled into the form of a loop a considerable pressure is required to distort the object in the direction of the axis of the loop.

The invention further provides for preventing the heat of the projection rays from being applied to the aperture plate whereby a cool plate is obtained and the fire hazard is lowered.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof, in which Fig. 1 is a side elevation of an aperture plate and film gate constructed in accordance with the present invention;

Fig. 3 is a front elevation of the aperture plate;

Like reference characters denote like parts in the several figures of the drawings.

In the following description and in the claims parts will be identified by specific names for convenience, but they are intended to be as generic in their application to similar parts as the art will permit.

Figure 1:
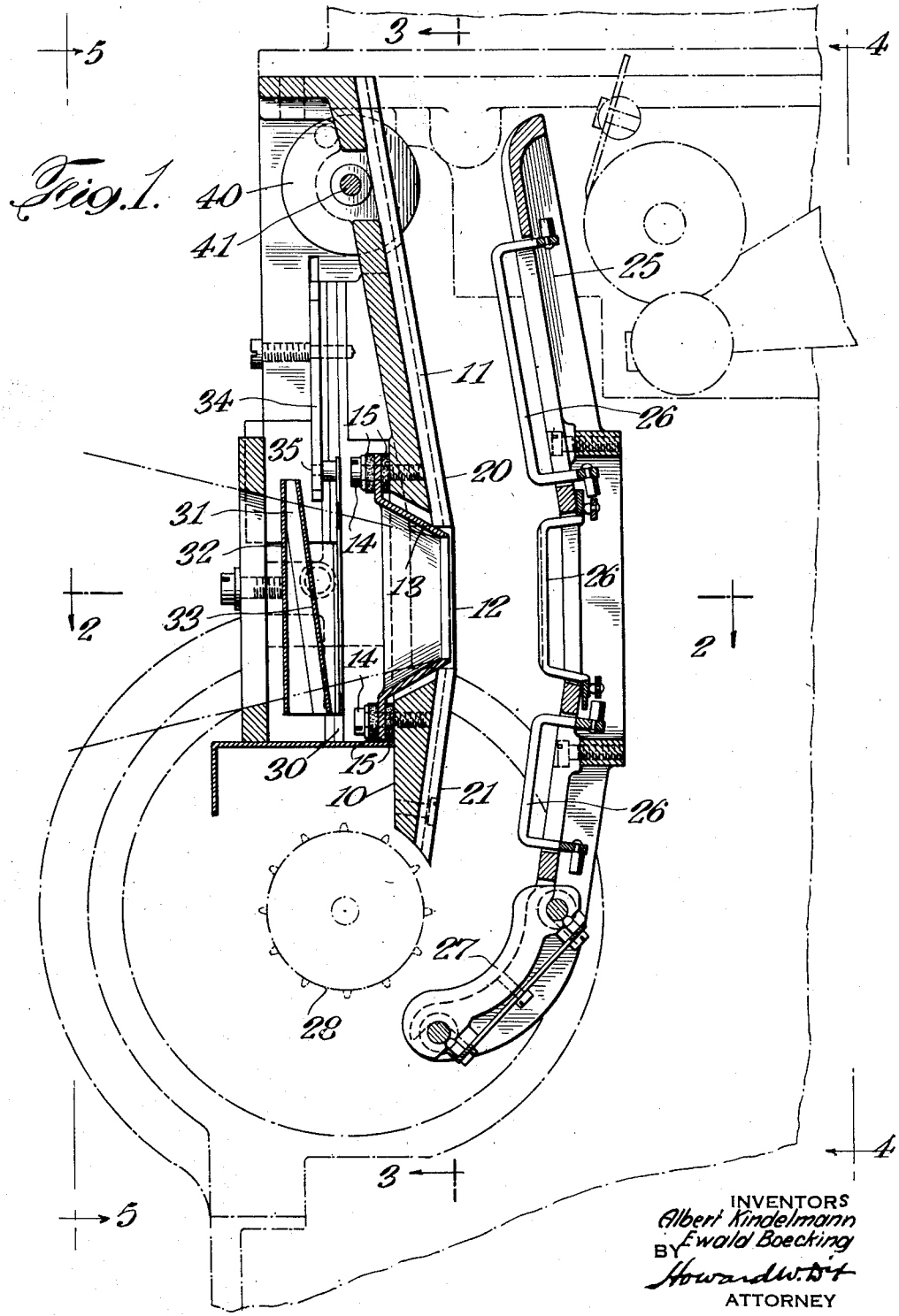

Referring to the drawings more in detail the invention is shown as applied to a projection machine having an aperture plate 10 to which a plurality of film guides 11 are secured. Said aperture plate is provided with an aperture 12 having a light shield 13 associated therewith. Said light shield is of frusto-conical shape and is secured to the aperture plate by screws 14 carrying washers 15 of heat insulating material, such as asbestos, between which the light shield is clamped. Aperture plate 10 is shown in Fig. 1 as formed with a pair of plane surfaces 20, 21 which extend to a point adjacent aperture 12 and are angularly disposed with respect thereto. These plane surfaces are so arranged that the film, in passing over the aperture plate, is caused to undergo a marked change in direction both above and below the aperture.

A film gate 25 of any well known form may be associated with the aperture plate and is constructed with a contour similar to that of said aperture plate whereby the film may be held in engagement therewith. Said film gate is provided with the usual pressure shoes which hold the film in contact with film guides 11. A pressure shoe 27 may be associated with film gate 25 in a position to guide the film on driving sprocket 28.

Figure 2:
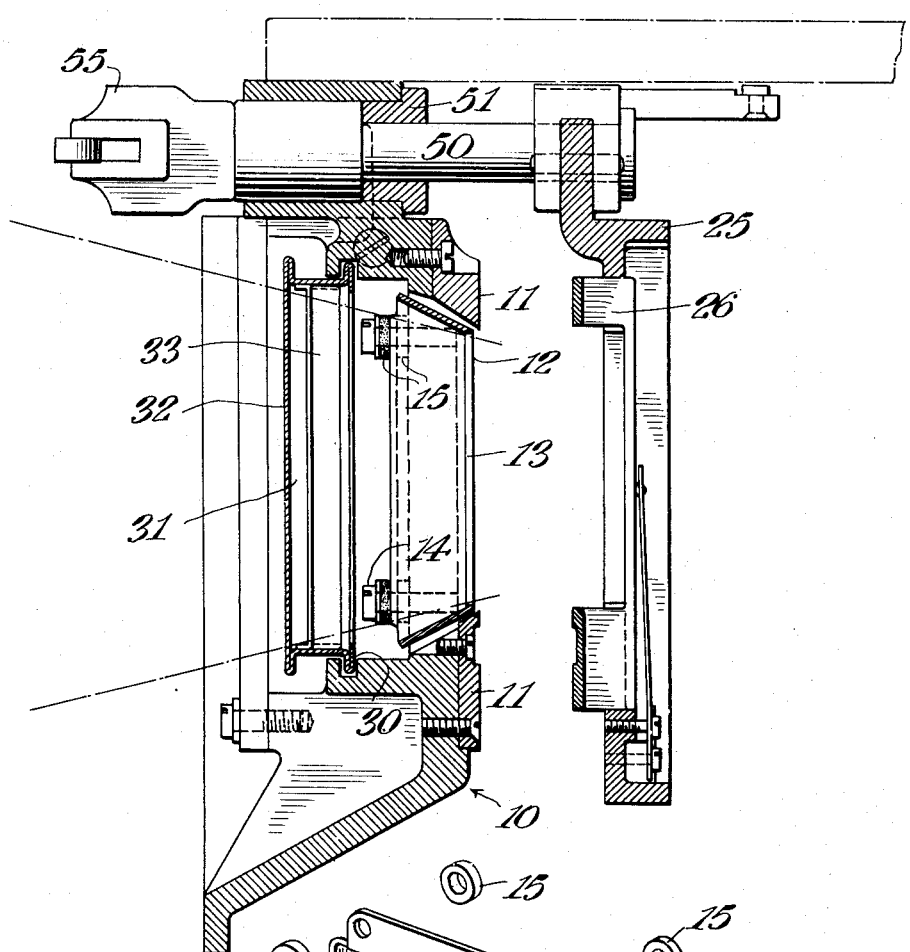
Fig. 2 is a transverse section taken on the line 2—2 of Fig. 1.
Figure 7:
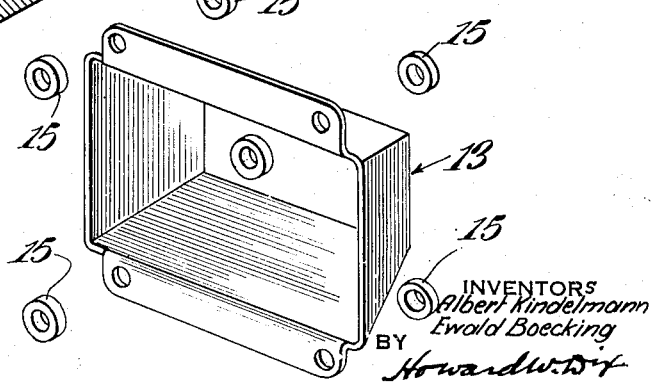
Fig. 7 is an enlarged detailed view of the light shield showing the heat insulating washers.
Figure 4:
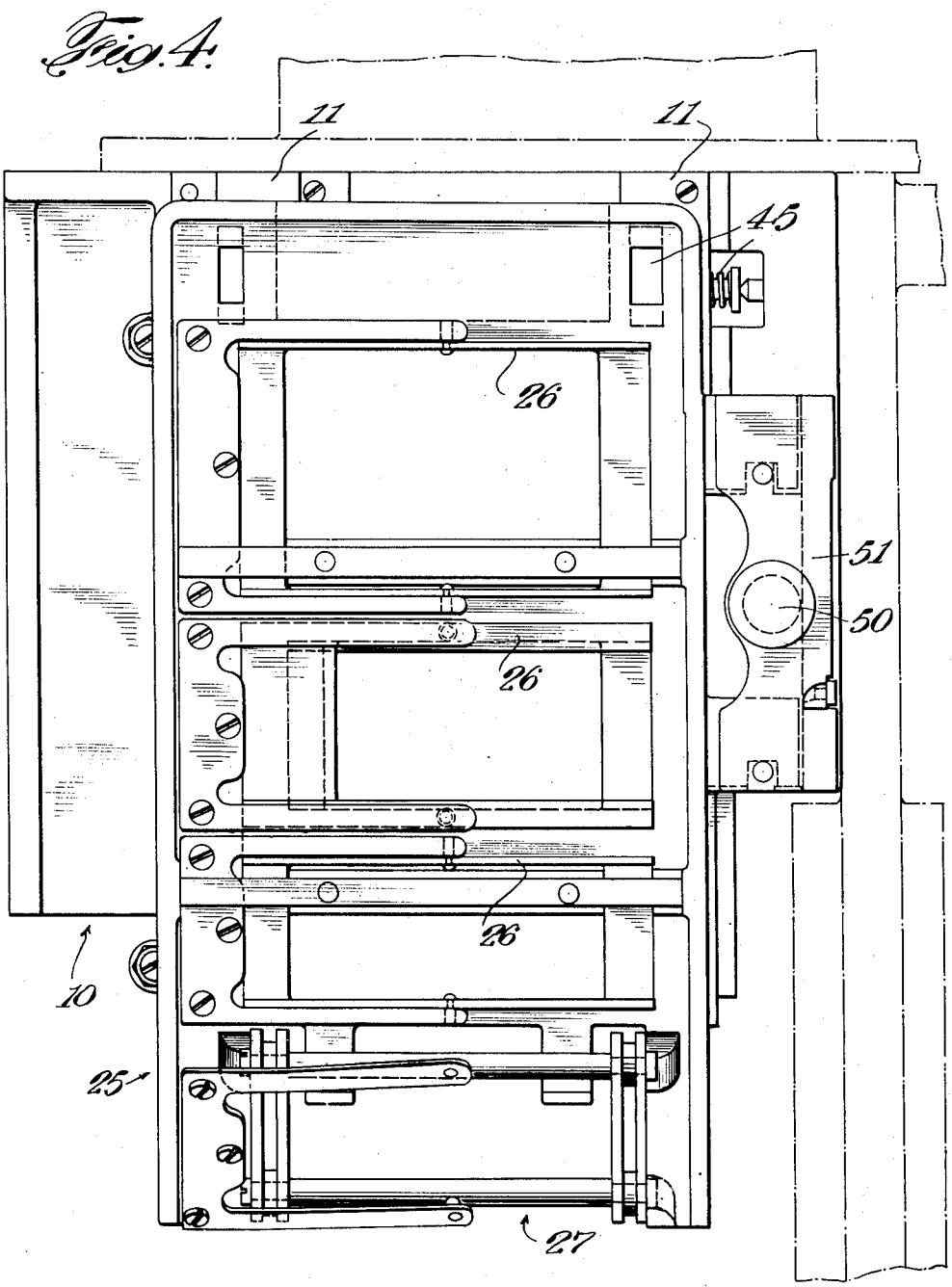
Fig. 4 is a front elevation of the film gate.
Figure 5:
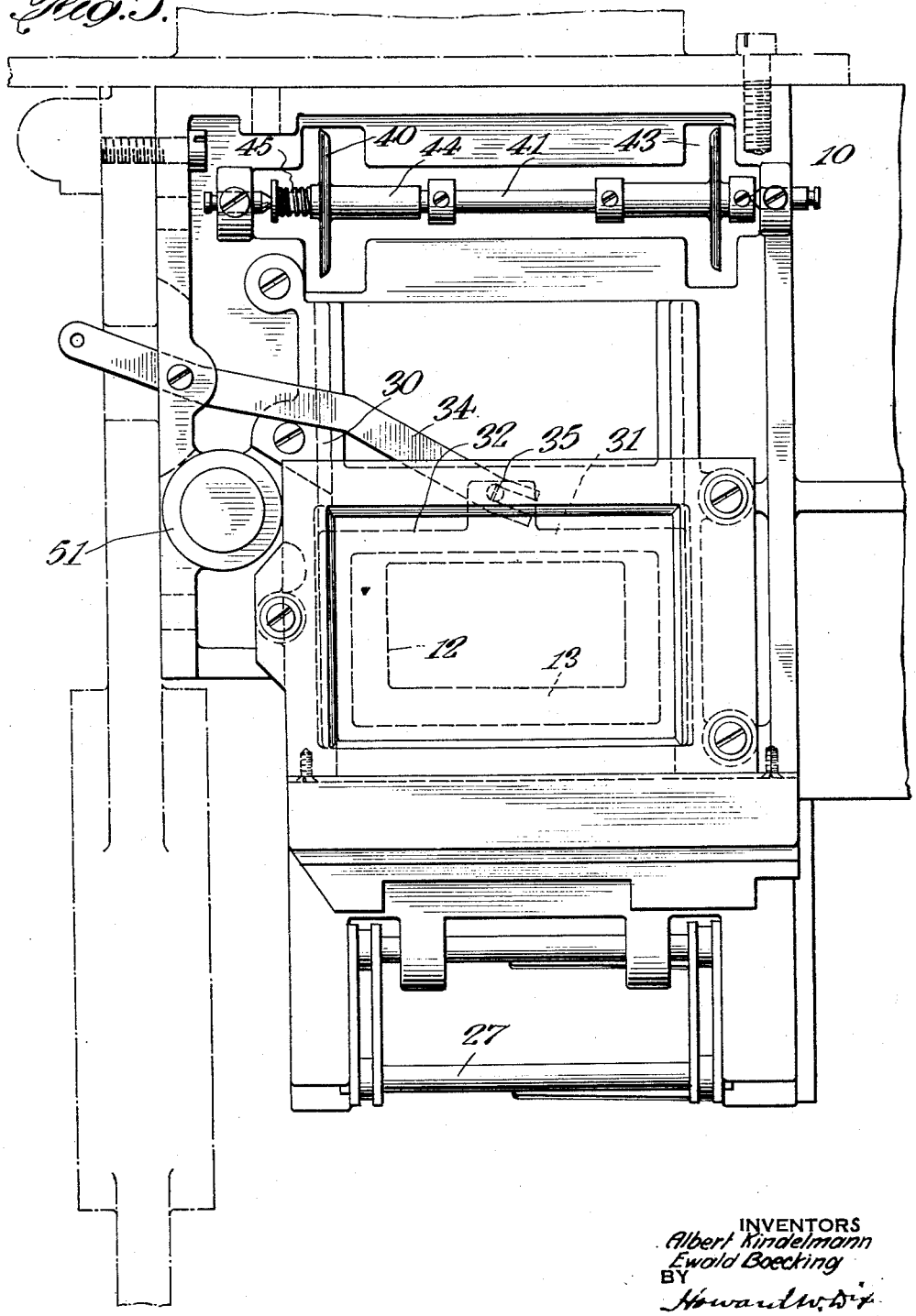
Fig. 5 is a rear elevation of the aperture plate.

Aperture plate 10 may be provided with a vertical groove 30 (Fig. 2) in which a fire gate 31 is adapted to slide. Said fire gate may comprise a framework 32 and an inclined shutter 33. Said framework may be secured to lever 34 as by pin 35 which may be operated in any convenient manner and used to cut off the light rays when the film becomes stationary. The film may be guided over aperture plate 10 by a series of rollers 40 which are mounted on shafts 41 and extend through openings 43 (Fig. 3) in said plate. One of said rollers may be provided with an elongated hub 44 which is slidable on shaft 41 and may be held by spring 45 in engagement with the edge of the film.

Film gate 25 may be mounted in any convenient manner for movement relative to aperture plate whereby the gate may be opened for applying or removing the film. Said film gate may be controlled by convenient means, such as plunger 50 secured thereto and extending through a suitable bore in housing 51. Plunger 50 may have a handle 55 associated therewith to permit the position of said gate to be readily controlled. The particular form of mounting and control for said film gate, however, form no part of the present invention and consequently will not be described in detail.

Figure 6:
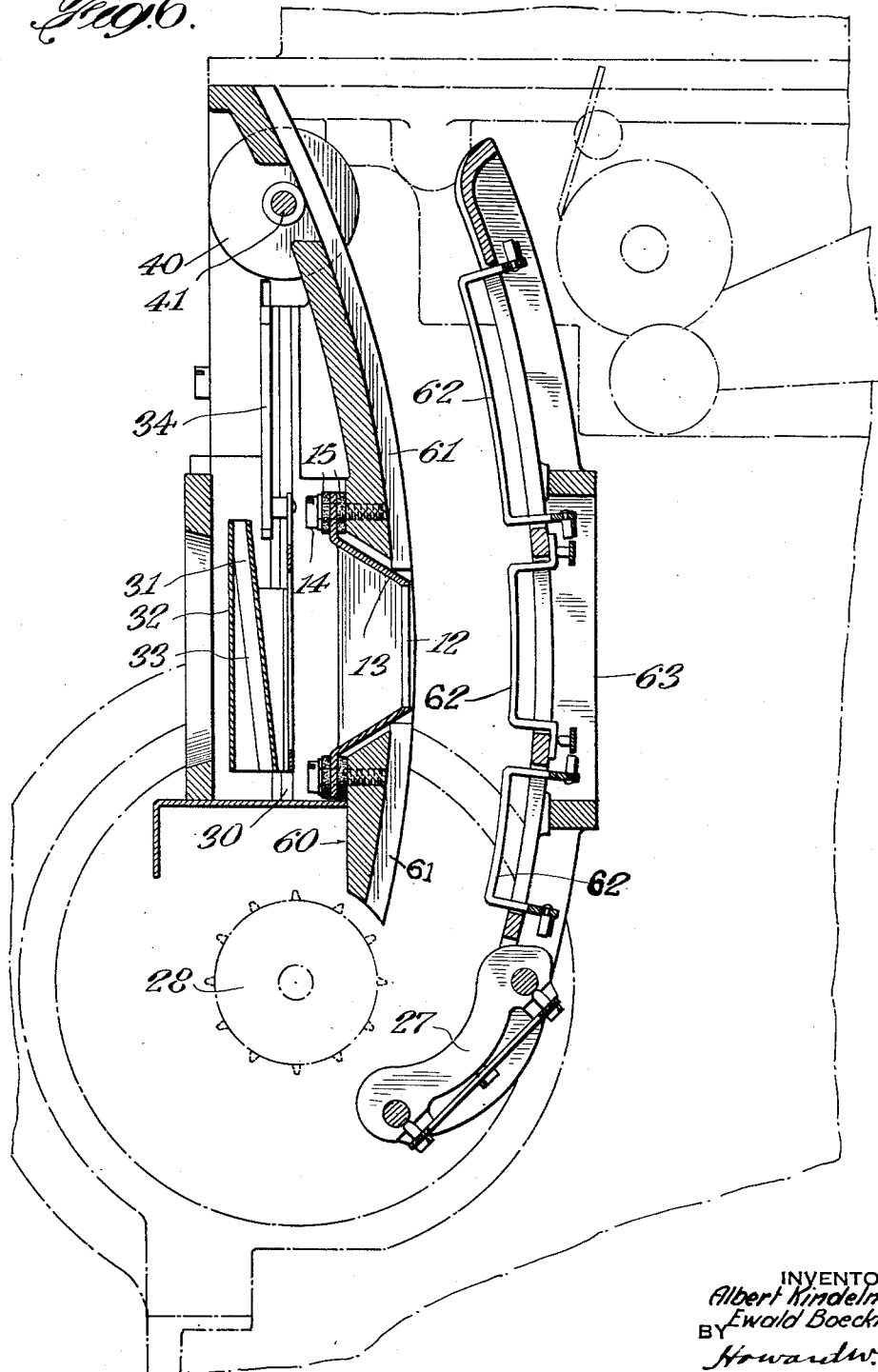
Fig. 6 is a side elevation partly in section of a modified form of plate.

In the modified form of the invention shown in Fig. 6, aperture plate 60 and guides 61 are formed with spherical surfaces. Pressure shoes 62 and film gate 63 are also spherical in shape for holding the film securely against film guides 61. The various other elements are similar to those shown in Figs. 1 to 5 and have been given the same reference numerals.

When a film is threaded over the aperture plate described above, it is caused to undergo a change in direction both above and below the aperture whereby a partial loop is formed. The transverse strength of this loop prevents the loop from buckling while passing over the aperture and permits the tension in the longitudinal direction to be reduced over that which would otherwise be required. It is obvious that the rate of curvature of the aperture plate may be varied within wide limits and the angular deviation of the various surfaces illustrated in Fig. 1 may be such as to approximate any desired rates of curvature.

By mounting the light shield 13 between heat insulating washers, the heat which is absorbed thereby from the projection rays is prevented from being transmitted directly to the metallic aperture plate and radiation of heat takes place from the light shield itself. This prevents the aperture plate from becoming hot as the film is passed thereover and reduces the tendency of the film to become ignited.

While certain novel features of the invention have been shown and described and are pointed out in the annexed claims, it will be understood that various omissions, substitutions and changes in the forms and details of the device illustrated and in its operation may be made by those skilled in the art without departing from the spirit of the invention.

What is claimed is:

1. In a motion picture apparatus, a stationary aperture plate having an aperture formed in a plane surface thereof, stationary film guides above and below said aperture said guides extending to a point adjacent said aperture and mounted at an angle to the plane thereof, and a film gate having pressure shoes cooperating with said film guides for holding the film in contact therewith.

2. In a motion picture apparatus, an aperture plate having an aperture formed in a plane surface thereof, film guides extending to a point adjacent said aperture and mounted in a plane different from the plane of said aperture, a film gate and pressure shoes mounted on said gate and adapted to maintain the film in contact with said film guides.

3. In a motion picture apparatus, a stationary aperture plate having an aperture formed in a plane surface thereof, film guides above and below said aperture, said guides extending to a point adjacent said aperture and mounted at angles to the plane thereof, and a film gate having a plurality of pressure shoes mounted in planes corresponding to the planes of said film guides and of said aperture, said apparatus being adapted to cause the film to bend transversely as it approaches and leaves said aperture and means for releasing said film gate to permit withdrawal or insertion of a film.

4. In a motion picture apparatus, an aperture plate having an aperture formed in a plane surface thereof, film guides extending above and below said aperture, said guides extending to a point adjacent said aperture and in planes different from the plane of said aperture, pressure shoes cooperating with said film guides for maintaining a film in intimate contact therewith, and a shield associated with said aperture plate for shielding the same from the heat of the projection rays, said shield being spaced from said plate and having heat insulating means for supporting the same whereby direct conduction of heat to said plate is prevented.

ALBERT KINDELMANN.
EWALD BOECKING.